(12) United States Patent
Santuka et al.

(10) Patent No.: US 11,818,101 B2
(45) Date of Patent: Nov. 14, 2023

(54) CONTEXT-BASED PATH SELECTION FOR VPN CLIENTS TO FACILITATE REMOTE ACCESS TO NETWORK-BASED APPLICATIONS

(71) Applicant: Cisco Technology, Inc., San Jose, CA (US)

(72) Inventors: Vivek Santuka, Morrisville, NC (US); Yeneneh Elfaged Gobena, Cary, NC (US); Hazim Hashim Dahir, Wake Forest, NC (US); Dhiren Tailor, Hertfordshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 191 days.

(21) Appl. No.: 17/498,338

(22) Filed: Oct. 11, 2021

(65) Prior Publication Data

US 2023/0114774 A1    Apr. 13, 2023

(51) Int. Cl.
*H04L 9/40* (2022.01)

(52) U.S. Cl.
CPC ........ *H04L 63/0272* (2013.01); *H04L 63/029* (2013.01); *H04L 63/0876* (2013.01); *H04L 63/107* (2013.01); *H04L 63/108* (2013.01)

(58) Field of Classification Search
CPC ............... H04L 63/0272; H04L 63/029; H04L 63/0876; H04L 63/107; H04L 63/108
See application file for complete search history.

(56) References Cited

U.S. PATENT DOCUMENTS

| | | | |
|---|---|---|---|
| 6,510,457 B1 * | 1/2003 | Ayukawa | G06Q 10/06 709/224 |
| 6,708,187 B1 * | 3/2004 | Shanumgam | H04L 41/0894 709/224 |
| 7,143,283 B1 * | 11/2006 | Chen | H04L 63/18 713/153 |

(Continued)

OTHER PUBLICATIONS

Pal Lakatos-Toth et al., "Cisco Remote Access Virtual Private Network on the AWS Cloud", Amazon Web Services, Jun. 2020, 24 pages.

(Continued)

*Primary Examiner* — J. Brant Murphy
(74) *Attorney, Agent, or Firm* — Edell, Shapiro & Finnan, LLC

(57) ABSTRACT

A server may receive, from a virtual private network (VPN) client of a client device, a message which indicates a request for a policy rule for communications with a network-based application (e.g. provided via a data center or cloud computing services). The server may obtain source attributes of the client device and a user thereof based on source identifiers, and destination attributes of the application based on a destination identifier, and select a policy rule associated with the attributes (e.g. indicative of security, risk, cost, load, and/or business function). The server may send a message which indicates a response and includes the policy rule for application at the VPN client. The policy rule may indicate a policy action for selecting a path, of a plurality of paths, identified by a path identifier, and specify conditions such as a location and/or a date, day, and/or time of the client device.

20 Claims, 12 Drawing Sheets

(56) References Cited

U.S. PATENT DOCUMENTS

| | | | |
|---|---|---|---|
| 7,213,021 B2 * | 5/2007 | Taguchi | H04L 41/0894 702/182 |
| 7,373,660 B1 * | 5/2008 | Guichard | H04L 63/0272 726/15 |
| 10,992,654 B2 * | 4/2021 | Raza | H04L 63/0471 |
| 11,102,169 B2 | 8/2021 | Enguehard et al. | |
| 2003/0133443 A1 * | 7/2003 | Klinker | H04L 45/123 370/353 |
| 2005/0203910 A1 * | 9/2005 | Taguchi | G06F 3/0635 |
| 2007/0064673 A1 * | 3/2007 | Bhandaru | H04W 40/246 370/351 |
| 2012/0227102 A1 | 9/2012 | Parla et al. | |
| 2014/0351441 A1 | 11/2014 | Madani et al. | |
| 2015/0304209 A1 | 10/2015 | Choudhury et al. | |
| 2015/0319050 A1 | 11/2015 | Kasturi et al. | |
| 2015/0334029 A1 * | 11/2015 | Patil | H04L 63/145 370/235 |
| 2016/0315808 A1 | 10/2016 | Saavedra | |
| 2017/0230274 A1 | 8/2017 | Filsfils et al. | |
| 2018/0084012 A1 * | 3/2018 | Joseph | H04L 63/108 |
| 2018/0198683 A1 * | 7/2018 | Erb | H04L 41/0894 |
| 2018/0337889 A1 * | 11/2018 | Panchapakesan | H04L 9/14 |
| 2019/0036842 A1 | 1/2019 | Aranha et al. | |
| 2019/0289061 A1 | 9/2019 | Theroux et al. | |
| 2019/0342266 A1 | 11/2019 | Ramachandran et al. | |
| 2020/0059457 A1 * | 2/2020 | Raza | H04L 69/14 |
| 2020/0145405 A1 | 5/2020 | Bosch et al. | |
| 2020/0186461 A1 | 6/2020 | Plisko et al. | |
| 2020/0204551 A1 | 6/2020 | Singh et al. | |
| 2020/0252374 A1 | 8/2020 | Bosch et al. | |
| 2021/0105225 A1 | 4/2021 | Stammers et al. | |
| 2021/0195667 A1 | 6/2021 | Shanks et al. | |
| 2021/0212135 A1 | 7/2021 | Shanks et al. | |
| 2022/0201041 A1 * | 6/2022 | Keiser, Jr. | H04L 41/0893 |

OTHER PUBLICATIONS

Cisco Systems, Inc., "Cisco AnyConnect Secure Mobility Client Administrator Guide, Release 4.8", Jul. 29, 2021, 314 pages.

Dhathri R. Purohith et al., "SIFM: A network architecture for seamless flow mobility between LTE and WiFi networks—Analysis and Testbed Implementation", Springer CSI Transactions on ICT 7.1, Mar. 2019, arXiv: 1702.07489, 15 pages.

Sead Fadilpašić, "Viscosity VPN client review", TechRadar, Feb. 4, 2021, 5 pages.

SparkLabs, "Connection Settings", retrieved from Internet Sep. 29, 2021, 13 pages; https://www.sparklabs.com/support/kb/article/connection-settings/#networking.

Cisco Systems, Inc., "Cisco AnyConnect Secure Mobility Solution Guide", retrieved from Internet Sep. 29, 2021, 24 pages; https://www.cisco.com/c/dam/en/us/td/docs/security/wsa/wsa7-0/user_guide/AnyConnect_Secure_Mobility_SolutionGuide.pdf.

* cited by examiner

| IDENTIFIER | ATTRIBUTES |
|---|---|
| $ID_{USER1}$ (SOURCE)<br>$ID_{USER2}$ (SOURCE)<br>$ID_{USER3}$ (SOURCE)<br>... | ATTRIBUTE(S) OF USER 1 (OR DATA THEREOF)<br>ATTRIBUTE(S) OF USER 2 (OR DATA THEREOF)<br>ATTRIBUTE(S) OF USER 3 (OR DATA THEREOF)<br>... | 910
| $ID_{DEVICE1}$ (SOURCE)<br>$ID_{DEVICE2}$ (SOURCE)<br>$ID_{DEVICE3}$ (SOURCE)<br>... | ATTRIBUTE(S) OF DEVICE 1 (OR DATA THEREOF)<br>ATTRIBUTE(S) OF DEVICE 2 (OR DATA THEREOF)<br>ATTRIBUTE(S) OF DEVICE 3 (OR DATA THEREOF)<br>... | 912
| $ID_{APPLICATION1}$ (DESTINATION)<br>$ID_{APPLICATION2}$ (DESTINATION)<br>$ID_{APPLICATION3}$ (DESTINATION)<br>... | ATTRIBUTE(S) OF APP 1 (OR DATA THEREOF)<br>ATTRIBUTE(S) OF APP 2 (OR DATA THEREOF)<br>ATTRIBUTE(S) OF APP 3 (OR DATA THEREOF)<br>... | 914
| $ID_{NTWK\text{-}BASED\ SERVICE1}$ (DESTINATION)<br>$ID_{NTWK\text{-}BASED\ SERVICE2}$ (DESTINATION)<br>$ID_{NTWK\text{-}BASED\ SERVICE3}$ (DESTINATION)<br>... | ATTRIBUTE(S) OF SERVICE 1 (OR DATA THEREOF)<br>ATTRIBUTE(S) OF SERVICE 2 (OR DATA THEREOF)<br>ATTRIBUTE(S) OF SERVICE 3 (OR DATA THEREOF)<br>... | 916

| Application/User Name | Destination | Metadata List |
|---|---|---|
| Application 1 | hrapp1.domain.org | HR Application, PII data, high compliance risk. 2FA enabled application |
| User | | HR_User, Compliant device, Corporate Asset |
| Application 2 | hrapp2.domain.org | HR Application, 2FA enabled application, No PII data |

| User Metadata | Application Metadata | Route Decision |
|---|---|---|
| HR User on compliant device | HR Application & PII data & High compliance risk | Route to DC |
| HR User on compliant device | HR Application & 2FA Enabled & No PII data | Route to AWS |
| HR User | External Traffic | Route to SASE |

FIG.12

CONTEXT-BASED PATH SELECTION FOR VPN CLIENTS TO FACILITATE REMOTE ACCESS TO NETWORK-BASED APPLICATIONS

TECHNICAL FIELD

The present disclosure relates generally to telecommunications systems, and more particularly to techniques and mechanisms for context-based path selection for virtual private network (VPN) clients of client devices to facilitate remote access to a plurality of network-based applications provided via a plurality of network-based services.

BACKGROUND

Network-based applications for client devices with virtual private network (VPN) clients for remote access may be spread across different service providers and clouds. The service providers and clouds may include Software as a Service (SaaS) providers, Infrastructure as a Service (IaaS) clouds, and Secure Access Service Edge (SASE) provider clouds.

Most existing remote access solutions provide simplistic ways of selecting a path (e.g. one of a plurality of tunnels) for outgoing traffic. For example, a path may be selected according to a destination Internet Protocol (IP) address of the outgoing traffic. Here, a VPN client may send the traffic via a selected one of a plurality of tunnels, or a path outside of the tunnels, according to the destination IP address. It has been identified, however, that destination address-based path selection may not be the most effective approach in terms of security or cost.

BRIEF DESCRIPTION OF THE DRAWINGS

FIG. 9 is a table for illustrating an example collection and storage of one or more attributes of a plurality of entities in association with identifiers of the entities, where the plurality of entities are of different entity types which include a plurality of client devices and/or users thereof and a plurality of network-based applications;

FIG. 11 is a table for illustrating a more specific example of collection and storage of the one or more attributes of the plurality of entities in association with identifiers of the entities;

FIG. 12 is a table for illustrating a more specific example of creation and storage of a plurality of policy rules associated with selected combinations of attributes of the different types of entities.

DESCRIPTION OF EXAMPLE EMBODIMENTS

Overview

Figure 1:
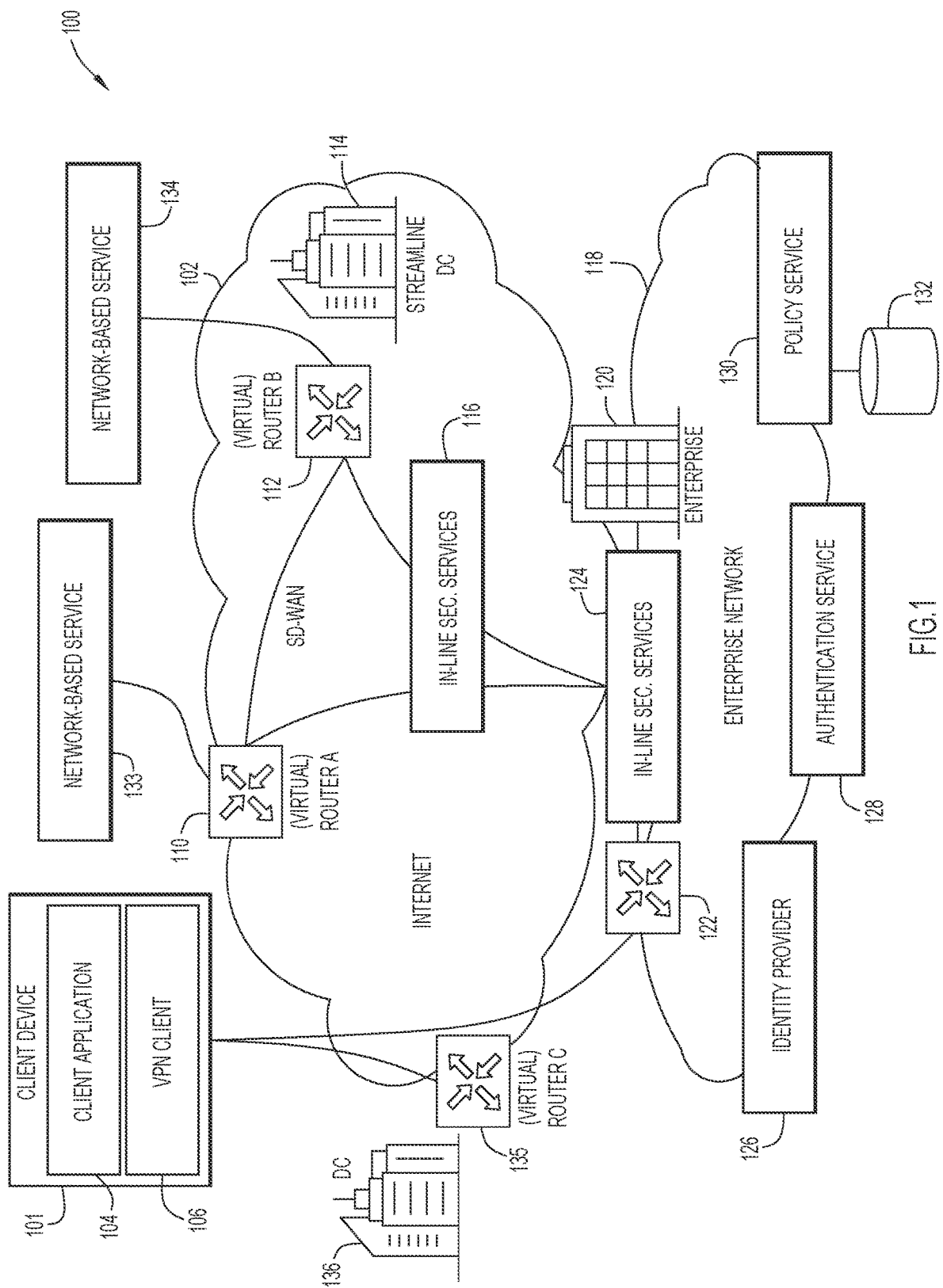
FIG. 1 is an illustrative representation of a network architecture for virtual private networking (VPN) according to a conventional implementation.

Techniques and mechanisms are described for context-based path selection for virtual private network (VPN) clients of client devices to facilitate remote access to a plurality of network-based applications provided via a plurality of network-based services.

In one illustrative example, a method may be performed at a server of a processing system configured for VPN clients to facilitate remote access to a plurality of network-based applications provided via a plurality of network-based services. The method may involve receiving, from a VPN client of a client device, a message which indicates a request for a policy rule for communications with a network-based application. The message which indicates the request for the policy rule may include one or more source identifiers associated with the client device and/or a user thereof and a destination identifier associated with the network-based application. The method may further involve obtaining one or more source attributes of the client device and/or the user thereof based on the one or more source identifiers, and one or more destination attributes of the network-based application based on the destination identifier. The method may further involve selecting a policy rule that is associated with the one or more source attributes and the one or more destination attributes. The method may further involve sending, to the VPN client of the client device, a message which indicates a response to the request and includes the policy rule for application at the VPN client, where the policy rule indicates a policy action for selecting a path, of a plurality of paths, identified by a path identifier for the communications with the network-based application.

In some implementations, the plurality of network-based services may comprise a data center service and one or more cloud computing services, and the plurality of paths may include paths comprising a plurality of tunnels. In some implementations, the one or more source attributes and the one or more destination attributes that are used to select the policy rule may comprise attributes indicative of security, risk, cost, availability, load, business function, or combinations thereof. In some implementations, the policy rule may indicate one or more conditions associated with at least one of a location and a date, day, and/or time associated with the client device.

In some preferred implementations, the server of the processing system may operate to create policy rules that provide selected paths that are balanced tradeoffs or optimizations between security, risk, cost, availability, load, and/or business function. In some further implementations, the server of the processing system may operate to create policy rules that provide selected paths that are balanced tradeoffs or optimizations between security, risk, cost, availability, load, and/or business function that vary depending on the location and/or the date, day, and/or time of day of the client device.

Prior to performing the above-described steps, the server of the processing system may perform pre-processing steps including, for each one of a plurality of entities including entities of a plurality of different types (e.g. a plurality of client devices and/or users thereof and the plurality of network-based applications), collecting, from one or more network-based sources, one or more attributes of an entity associated with an identifier. Additional pre-processing steps may further include storing, in an attributes database, the one or more attributes of the entity in association with the identifier. Additional pre-processing steps may further include, for each one of a plurality of different combinations of attributes of the plurality of different types of entities, creating and storing, in a policy database, a policy rule associated with a selected combination of attributes of the different types of entities, where the policy rule indicates a policy action for selecting a path, of a plurality of paths, identified by a path identifier.

In another illustrative example, a method may be performed at a VPN client of a client device to facilitate remote access to a plurality of network-based applications provided via a plurality of network-based services. The method may involve sending, to a server, a message which indicates a request for a policy rule for communications with a network-based application. The method may further involve receiving, from the server, a message which indicates a response to the request and includes the policy rule, and storing the policy rule in memory. The method may further involve executing the policy rule which indicates a policy action for selecting a path, of a plurality of paths, identified by a path identifier for the communications with the network-based application. The method may further involve directing communications associated with at least a destination identifier of the network-based application via the selected path corresponding to the selected path identifier.

In some implementations, the plurality of network-based services may comprise a data center service and one or more cloud computing services, and the plurality of paths may include paths comprising a plurality of tunnels. In some implementations, the message which indicates the request for the policy rule may include one or more source identifiers associated with the client device and/or a user thereof and a destination identifier associated with the network-based application. In some implementations, the policy rule may be selected based on one or more source attributes of the client device and/or the user thereof based on the one or more source identifiers and one or more destination attributes of the network-based application based on the destination identifier. In some implementations, the one or more source attributes and the one or more destination attributes that are used to select the policy rule may comprise attributes indicative of security, risk, cost, availability, load, business function, or combinations thereof.

In some implementations, the policy rule may indicate one or more conditions associated with at least one of a location and a date, day, and/or time. Here, the method may further involve obtaining at least one of a current location and a current date, day, and/or time associated with the client device, and executing the policy rule based on at least one of the current location and the current date, day, and/or time associated with the client device.

In some preferred implementations, the VPN client of the client device may receive policy rules that provide for selected paths that are balanced tradeoffs or optimizations between security, risk, cost, availability, load, and/or business function. In some further implementations, the VPN client of the client device may receive policy rules that provide for selected paths that are balanced tradeoffs or optimizations between security, risk, cost, availability, load, and/or business function that vary depending on the location and/or the date, day, and/or time of day of the client device.

A computer program product may include a non-transitory computer readable medium and instructions in the non-transitory computer readable medium, where the instructions are executable by one or more processors for performing the methods described herein. A computing device, such as a network node or a user device, may include one or more processors, one or more interfaces to connect in a network, and one or more memory elements for storing instructions executable on the one or more processors for performing the methods described herein.

More detailed and alternative techniques and implementations are provided herein as described below.

EXAMPLE EMBODIMENTS

FIG. 1 is an illustrative representation of a network architecture 100 for virtual private networking (VPN) according to a conventional implementation. A client device 101 may include one or more client applications 104 and a VPN client 106 for remote access to network-based applications that are provided by various network-based services. Client device 101 may remotely access the network-based applications with VPN client 106 via one or more networks 102 (e.g. the Internet and/or other). The network-based services may include data center services and cloud computing services. More specifically in FIG. 1, the network-based services may include a data center service 136, a data center service 114, a network-based service 133 which may be a cloud computing service (e.g. of a first service provider), and a network-based service 134 which may also be a cloud computing service (e.g. of a second service provider). The service providers and clouds may include Software as a Service (SaaS) providers, Infrastructure as a Service (IaaS) clouds, and Secure Access Service Edge (SASE) provider clouds, as examples.

One or more (virtual) routers 110, 112, and 135 may provide connectivity to network-based services 133 and 134. In some implementations, routers 110, 112, and 135 may facilitate overlay networking and, more specifically, may implement a Software-Defined Wide Area Network (SD-WAN) according to some implementations. In some implementations, VPN client 106 of client device 101 may be a Cisco AnyConnect™ application, or any other suitable VPN client application. In some implementations, various in-line services 116, 124 may be made available along particular traffic paths.

In some implementations, network architecture 100 of FIG. 1 includes an enterprise network 118 of an enterprise 120 of which a user of client device 101 is a member. Client device 101 may access enterprise network 118 via a router 122. In an example implementation, an identity provider 126 of enterprise network 118 may provide credentials, extended with security assertions (e.g. security assertion markup language "SAML" statements). Also, an authentication service 128 may provide authentication (e.g. with use of multi-factor authentication) for members utilizing particular enterprise client devices. This may be provided, for example, by way of a user-centric access security platform that provides two-factor authentication service (e.g. DUO). A policy service 130 may provide a policy database 132 which contains policies for routing and disposition of flows. In some example implementations, policy service 130 may coordinate with a single-sign-on (SSO) or other authentication service.

As is apparent, the network-based applications for client device 101 may be spread across different service providers and clouds. VPN client 106 of client device 101 may operate to select one of a plurality of different paths (e.g. tunnel paths or tunnels) to direct communication traffic to these network-based applications. Most existing remote access solutions provide simplistic ways of selecting a path for outgoing traffic. For example, a path may be selected according to a destination Internet Protocol (IP) address of the outgoing traffic. Here, a VPN client may send the traffic via a selected one of a plurality of tunnels, or a path outside of the tunnels, according to the destination IP address. It has been identified, however, that destination address-based path selection may not be the most effective approach in terms of security or cost.

Figure 2:
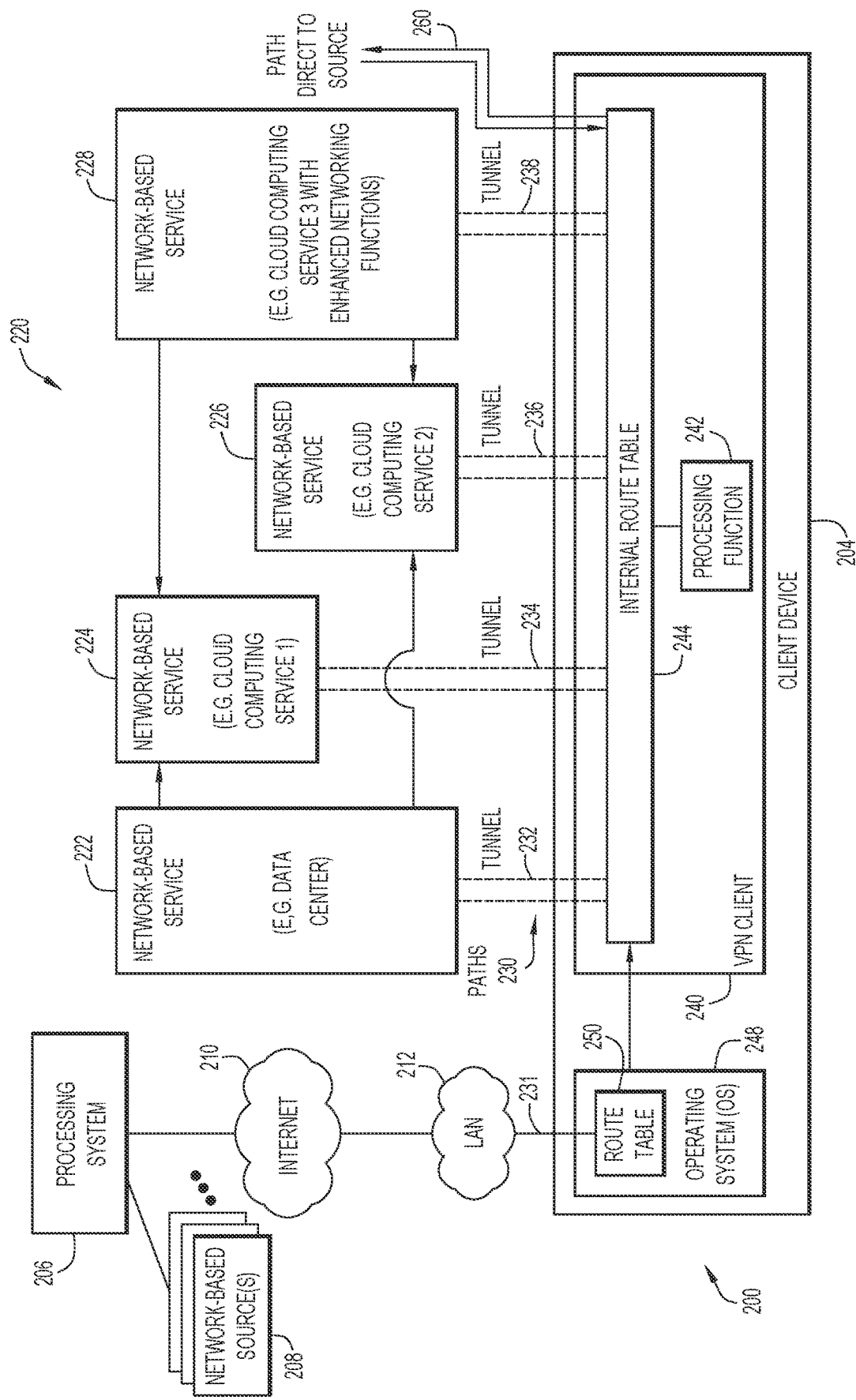
FIG. 2 is an illustrative representation of a network architecture within which context-based path selection for a VPN client of a client device to facilitate remote access to a plurality of network-based applications according to some implementations of the present disclosure may be utilized.

FIG. 2 is an illustrative representation of a network architecture 200 within which context-based path selection for a VPN client of a client device may be utilized, to facilitate remote access to a plurality of network-based applications according to some implementations of the present disclosure. Components and entities in network architecture 200 of FIG. 2 may utilize at least some of the basic principles of operation as described in relation to FIG. 1. A client device 204 having a VPN client 240 may operate to remotely access a plurality of network-based applications provided by a plurality of network-based services 220. In some implementations, client device 204 may be a computer, a laptop, a tablet device, a smart phone, or any suitable computing device. In some implementations, VPN client 240 of client device 204 may be a Cisco AnyConnect™ application, or another other suitable VPN client application.

In FIG. 2, network-based services 220 include a network-based service 222 (e.g. a data center), a network-based service 224 (e.g. a cloud computing service 1 of a service provider 1), a network-based service 226 (e.g. a cloud computing service 2 of a service provider 2), and a network-based service 228 (e.g. a cloud computing service 3 with enhanced networking functions of a service provider 3). In some implementations, network-based service 224 may be or be based on a Google Cloud Platform (GCP), and network-based service 226 may be or be based on Amazon Web Services (AWS). In some implementations, network-based service 228 may be a SASE, and which may be configured to provide WAN networking and enhanced security features.

VPN client 240 of client device 204 may operate to select one of a plurality of different paths 230 (e.g. tunnel paths or tunnels) to direct communication traffic to a network-based application. The plurality of different paths 230 may include different tunnel paths or tunnels, which may include a tunnel path 232 to network-based service 222, a tunnel path 234 to network-based service 224, a tunnel path 236 to network-based service 226, and a tunnel path 238 to network-based service 228. The plurality of different paths 230 may further include non-tunnel paths, such as a path 231 to the Internet 210 via a local area network (LAN) 212 of client device 204, for remote access to network-based applications. Also, the plurality of different paths 230 may include a direct path 260 which may be utilized as a direct-to-source/destination path. As is apparent to those ordinarily skilled in the art, such paths and their associated communications may be associated with various levels of security (e.g. low or high), various levels of risk (e.g. low or high), various levels of cost (e.g. low or high), etc. Such levels of security, risk, cost, availability, load, etc., may even vary depending on the location and/or the date, date, and/or time of client device 204 (e.g. due to mobility and/or time of use).

According to the present disclosure, VPN client 240 of client device 204 may be configured to select paths that are appropriate (e.g. tailored in terms of security, risk, cost, availability, load, business function, and/or combinations thereof) for remote access to network-based applications that are provided via the plurality of network-based services 220. Also according to the present disclosure, a processing system 206 (e.g. a central processing system) may be configured to assist in selecting paths for VPN clients that are appropriate (e.g. tailored in terms of security, risk, cost, availability, load, business function, and/or combinations thereof) for remote access to the network-based applications provided via the plurality of network-based services 220. In some implementations, client device 204 may access processing system 206 via the Internet 210 through LAN 212.

Figure 3:
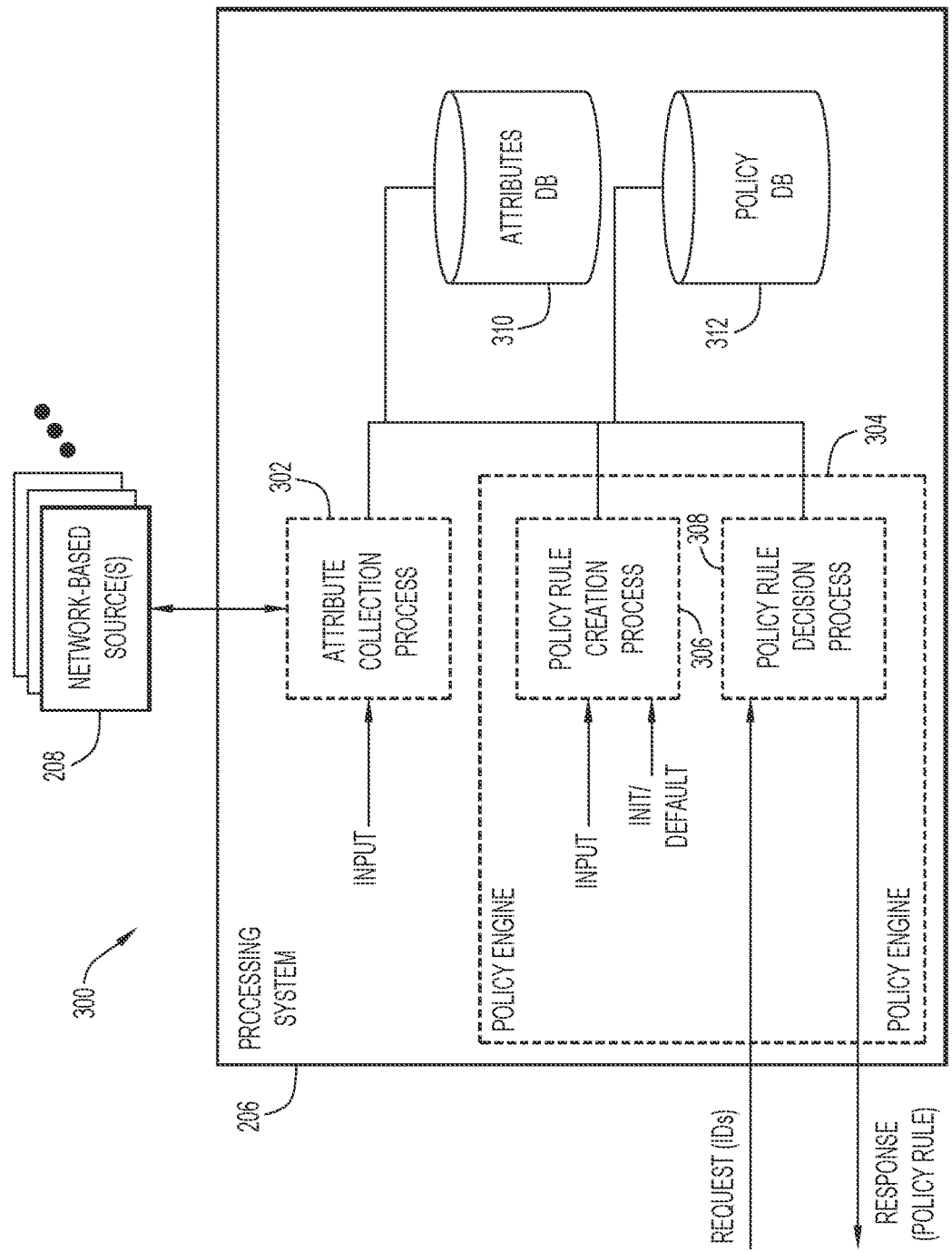
FIG. 3 is a schematic block diagram of a processing system for use in context-based path selection for VPN clients of client devices according to some implementations of the present disclosure, where the processing system may include an attribute collection process and a policy engine having a policy rule creation process and a policy rule selection process.

FIG. 3 is a schematic block diagram 300 of processing system 206 for use in context-based path selection for VPN clients of client devices to facilitate remote access to a plurality of network-based applications via a plurality of network-based services according to some implementations of the present disclosure.

As shown in FIG. 3, processing system 206 of FIG. 3 may include an attribute collection process 302 and a policy engine 304 which includes a policy rule creation process 306 and a policy rule selection process 308. Attribute collection process 302 may be configured to collect, from one or more network-based sources 208, one or more attributes of an entity associated with an identifier. The attributes may be indicative of security, risk, cost, availability, load, business function, and/or combinations thereof, associated with the entity. Attribute collection process 302 may be further configured to store, in an attributes database 310 (or an "ID-to-attributes" database), the one or more attributes of the entity in association with the identifier. Attribute collection process 302 may perform such attribute collection and storage for each one of a plurality of entities including entities of a plurality of different types. The entities of the plurality of different types may be a plurality of client devices and/or users thereof, the plurality of network-based applications, and/or the plurality of network-based services. As shown in FIG. 3, an input (e.g. a manual or a process-triggered signal) may be used to trigger or regularly invoke the process of collecting and storing of attributes.

Again, the attributes may be indicative of security, risk, cost, availability, load, business function, and/or combinations thereof. As some specific examples, attributes may indicate network-based applications that are human resources (HR) applications versus standard applications, client devices that are non-compliant devices versus compliant devices, client devices that are corporate assets versus non-corporate assets, client devices that are high-compliant risk versus low-compliant risk, network-based applications that involve personal identifiable information (PII) versus non-PII data, and users that are executive employees versus maintenance employees.

Once attributes are retrieved and stored in attributes database 310, policy rule creation process 306 may be configured to create and store, in a policy database 312, a policy rule associated with a selected combination of attributes of the different types of entities, for each one of a plurality of different combinations (all possible or viable) of attributes associated with the different types entities. Each policy rule may indicate a policy action for selecting a path, of a plurality of paths, identified by a path identifier for communications with a network-based application. As shown in FIG. 3, an initialization/default input and/or an administrative input may be used for creation of policy rules.

Once policy rules are created and stored in policy database 312, policy rule selection process 308 may be used to service requests from client devices (or their respective VPN clients). Here, processing system 206 may receive a message which indicates a request for a policy rule for communications with a network-based application, where the message may include source and destination identifiers (e.g. source, user, and destination application); obtain source and destination attributes from attributes database 310 based on the source and destination identifiers in the message; select a policy rule from policy database 312 based on the source and destination attributes; and send a message which indicates a response to the request and includes the policy rule for application at the VPN client, where the policy rule indicates a policy action for selecting a path, of a plurality of paths, identified by a path identifier for the communications with the network-based application. The VPN client of the client device may receive, store, and execute the policy rule for directing communications associated with the network-based application. Such path selection may be perform for each one of a plurality of different network-based applications that may be utilized by the client device, and may be further performed by processing system 206 for each one of a plurality of client devices operating in the system.

In some implementations of policy rule creation process 306, processing system 206 may operate to create policy rules which provide for selected paths that are balanced tradeoffs or optimizations between security, risk, cost, availability, load, and/or business function. In some further implementations of policy rule creation process 306, processing system 206 may operate to create policy rules that provide for selected paths that are balanced tradeoffs or optimizations between security, risk, cost, availability, load, and/or business function that vary depending on the location and/or the date, day, and/or time associated with the client device. Accordingly, when the context of the client device changes (e.g. a change in location of the client device, or a change in the day or time), the VPN client of the client device may execute that policy rule to identify a different and more suitable path to remotely access a network-based application.

With reference back to FIG. 2, a processing function 242 of VPN client 240 may operate in cooperation with processing system 206 for the context-based path selection to facilitate remote access as described. Processing function 242 may be configured to send requests and receive responses to requests for policy rules for communications with network-based applications. Processing function 242 may also be configured to execute policy rules to identify policy actions for selecting paths, and caching selected paths identified from the policy actions (e.g. in an internal route table 244 of VPN client 240). In some implementations, VPN client 240 may (initially) configure client device 204 to facilitate path selection according to a predetermined configuration. Here, processing function 242 of VPN client 240 may instruct an operating system (OS) 248 of client device 204 to direct all outgoing traffic from a route table 250 of the OS 248 to processing function 242, so that internal route table 244 associated VPN client 240 may be utilized for caching policy decisions/selected paths. Processing function 242 of VPN client 240 may then proceed to properly direct communication traffic according to the selected paths that are cached in internal route table 244.

Figure 4:
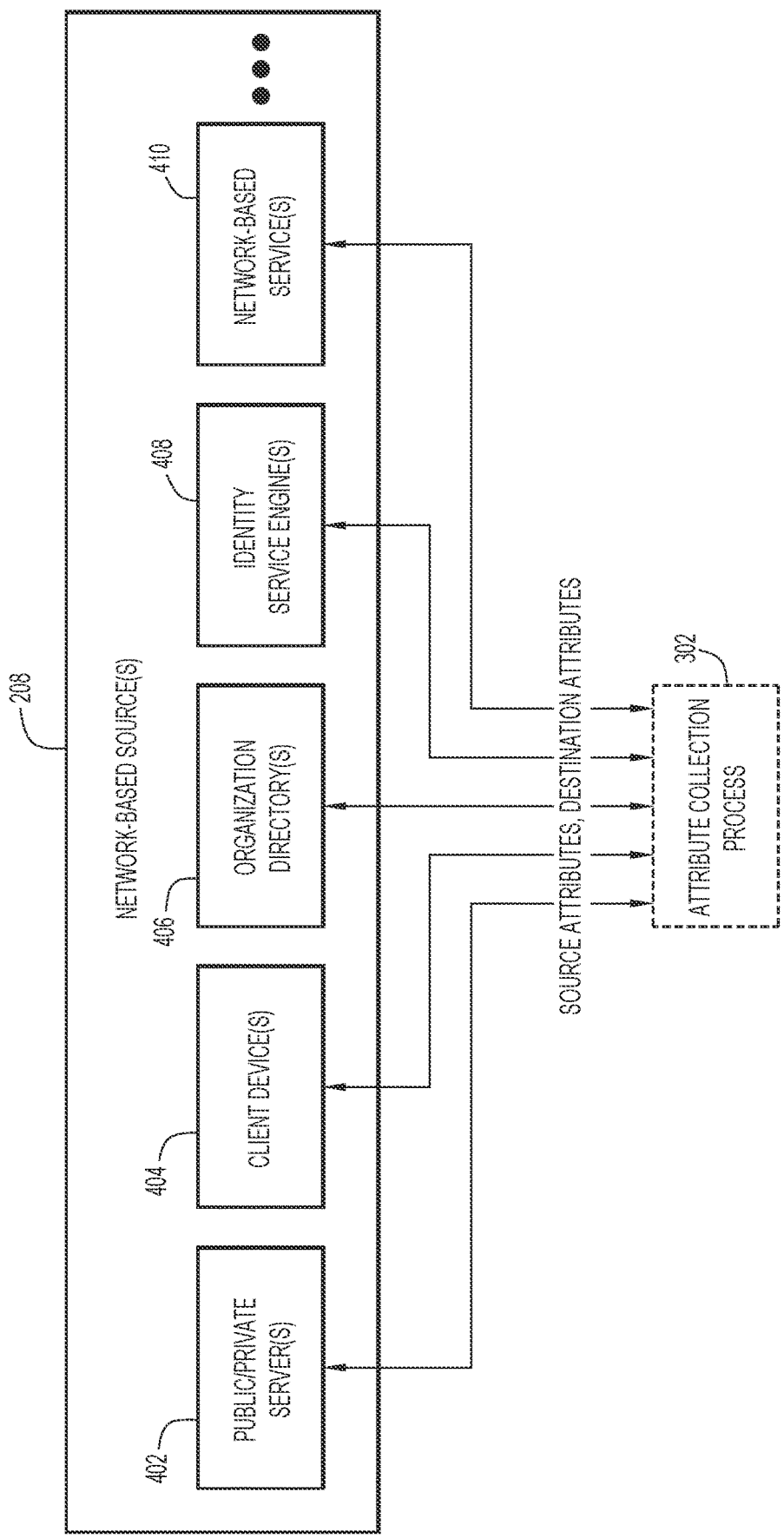
FIG. 4 is an illustrative representation of examples of one or more network-based sources with which the attribute collection process of the processing system may interact with, or examine the communications of, for use in identifying source and destination attributes.

FIG. 4 is an illustrative representation of examples of the one or more network-based sources 208 with which attribute collection process 302 of processing system 206 of FIGS. 2-3 may interact with for attribute retrieval, or examine (e.g. "sniff") the communications of, for obtaining source and destination attributes. In FIG. 4, one or more network-based sources 208 may include one or more public or private servers 402 (e.g. one or more public or private databases), one or more client devices 404, one or more organizational directories 406 (e.g. a directory for enterprise members or employees), one or more identity service engines 408, and one or more network-based services 410 (e.g. data center services, cloud computing services, etc.).

Figure 5:
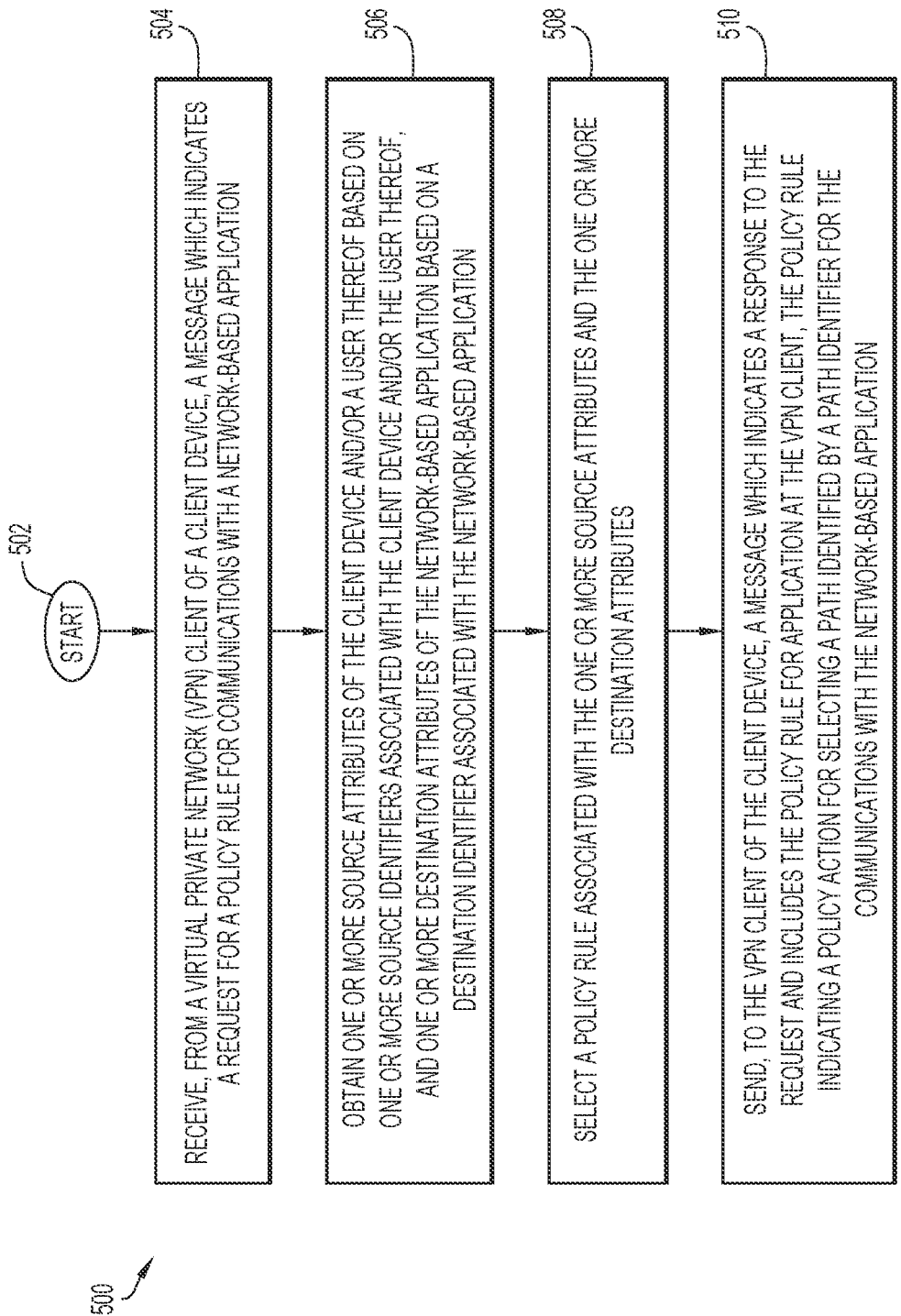
FIG. 5 is a flowchart for describing a method for use in context-based path selection for a VPN client of a client device to facilitate remote access to a plurality of network-based applications via plurality of network-based services according to some implementations of the present disclosure, where the method may be performed at a network node or server of the processing system and involve selecting a policy rule for application at the VPN client of the client device, where the policy rule indicates a policy action for selecting a path identified by a path identifier for communications with a network-based application.

FIG. 5 is a flowchart 500 for describing a method for use in context-based path selection for a VPN client of a client device to facilitate remote access to a plurality of network-based applications via plurality of network-based services according to some implementations of the present disclosure. In some implementations, the plurality of network-based services may comprise a data center service and one or more cloud computing services. In some implementations, the context-based path selection may involve a selection of one of a plurality of paths which include a plurality of tunnels.

The method of FIG. 5 may be performed by a network node or computing device (e.g. by a server) configured to connect in a network for communication. In some implementations, the method of FIG. 5 may be performed a server of processing system 206 of FIG. 2. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method.

Beginning at a start block 502 of FIG. 5, the network node may receive, from a VPN client of a client device, a message which indicates a request for a policy rule for communications with a network-based application (step 504 of FIG. 5). The message which indicates the request for the selection of the path may include one or more source identifiers associated with the client device and/or a user thereof, and a destination identifier associated with the network-based application. The network node may then obtain one or more source attributes of the client device and/or the user thereof based on the one or more source identifiers, and one or more destination attributes of the network-based application based on the destination identifier (step 506 of FIG. 5). The network node may select a policy rule that is associated with the one or more source attributes and the one or more destination attributes (step 508 of FIG. 5). The network node may then send, to the VPN client of the client device, a message which indicates a response to the request and includes the policy rule (step 510 of FIG. 5). The policy rule may indicate a policy action for selecting a path, of a plurality of paths, identified by a path identifier for the communications with the network-based application.

In some implementations, the one or more source attributes and the one or more destination attributes that are used to select the policy rule in step 506 may comprise attributes indicative of security, risk, cost, availability, load, business function, and/or combinations thereof. In some implementations, the policy rule may indicate one or more conditions associated with at least one of a location and a date, day, and/or time associated with the client device. In some preferred implementations, the server of the processing system may operate to create policy rules that provide selected paths that are balanced tradeoffs or optimizations between security, risk, cost, availability, load, and/or business function. In some further implementations, the server of the processing system may operate to create policy rules that provide selected paths that are balanced tradeoffs or optimizations between security, risk, cost, availability, load, and/or business function that vary depending on the location and/or the date, day, and/or time of day of the client device. A selected path may be or include a tunnel (e.g. a VPN tunnel) or even a direct path outside of the tunnels (e.g. in FIG. 2, one of the plurality of tunnel paths 232, 234, 236, and 238, or direct path 260).

Figure 6:
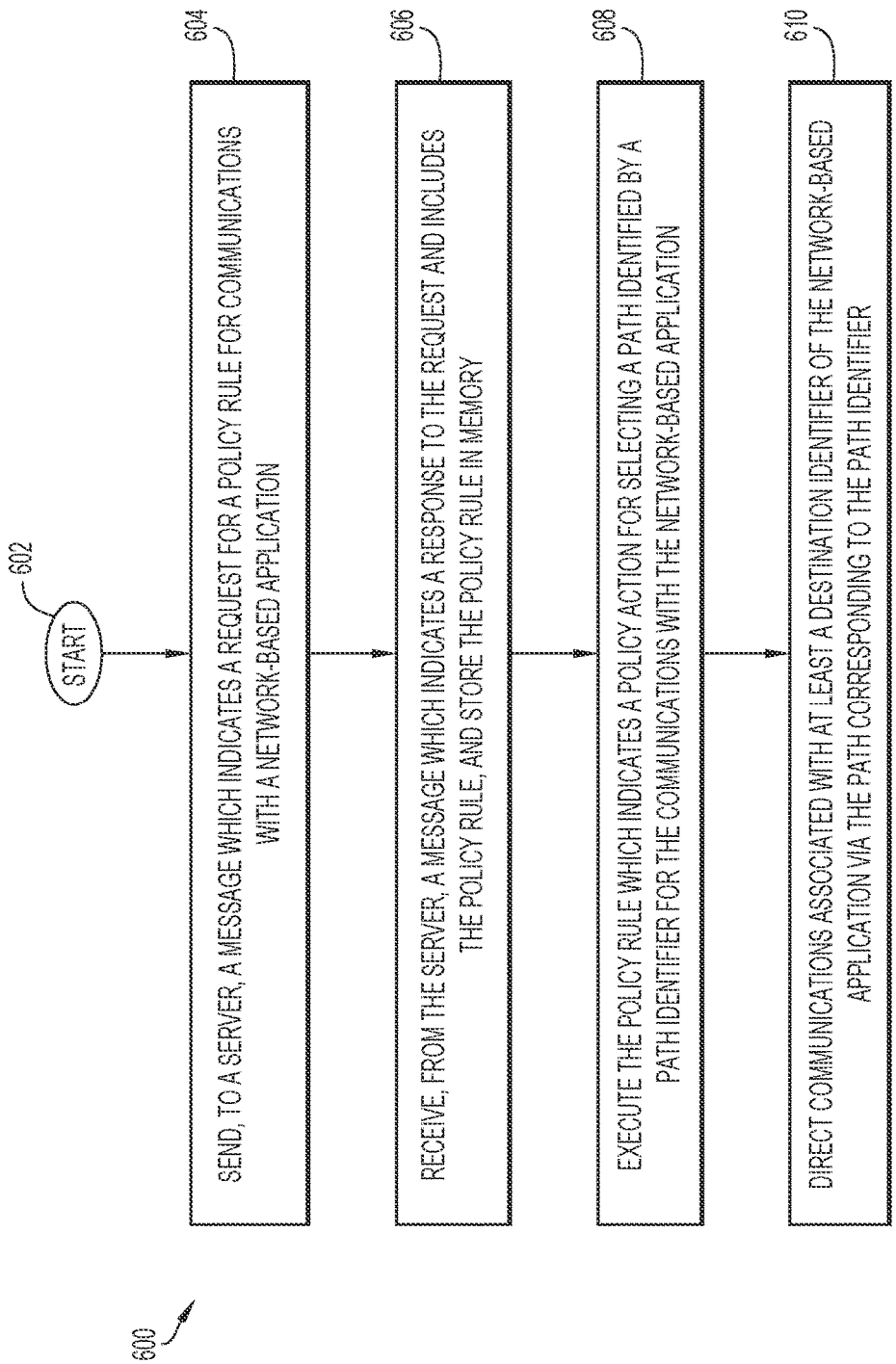
FIG. 6 is a flowchart for describing a method for use in context-based path selection for a VPN client of a client device to facilitate remote access to a plurality of network-based applications via plurality of network-based services according to some implementations of the present disclosure, where the method may be performed at the VPN client of the client device and involve requesting and receiving a policy rule which indicates a policy action for selecting a path identified by a path identifier for communications with the network-based application.

FIG. 6 is a flowchart 600 for describing a method for use in context-based path selection for a VPN client of a client device for remote access to a plurality of network-based applications via plurality of network-based services according to some implementations of the present disclosure. In some implementations, the plurality of network-based services may comprise a data center service and one or more cloud computing services. In some implementations, the context-based path selection may involve a selection of one of a plurality of paths which include a plurality of tunnels.

The method of FIG. 6 may be performed by a client device, and, in particular, by a VPN client of the client device (e.g. at processing function 242 of VPN client 240 of client device 204 of FIG. 2, in communications with the server of processing system 206 of FIG. 3). The method of FIG. 6 may be a corresponding method that corresponds to the method of FIG. 5. In some implementations, the client device may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method.

Beginning at a start block 602 of FIG. 6, the VPN client of the client device may send, to a server of a processing system, a message which indicates a request for a policy rule for communications with a network-based application (step 604 of FIG. 6). The VPN client of the client device may receive, from the server, a message which indicates a response to the request and includes the policy rule, and store the policy rule in memory (step 606 of FIG. 6). The VPN client of the client device may execute the policy rule which indicates a policy action for selecting a path, of a plurality of paths, identified by a path identifier for the communications with the network-based application (step 608 of FIG. 6). This selected path identifier may be cached in memory (e.g. or an internal route table), stored in association with at least a destination identifier of the network-based application. The VPN client of the client device may direct communications associated with at least the destination identifier of the network-based application via the path corresponding to the selected path identifier (step 610 of FIG. 6).

In some implementations, the message which indicates the request for the policy rule in step 604 may include one or more source identifiers associated with the client device and/or a user thereof and a destination identifier associated with the network-based application. In some implementations, the policy rule that is received and executed in steps 606 and 608 may be based on one or more source attributes of the client device and/or the user thereof based on the one or more source identifiers and one or more destination attributes of the network-based application based on the destination identifier. In some implementations, the one or more source attributes and the one or more destination attributes that are used to select the policy rule may comprise attributes indicative of security, risk, cost, availability, load, business function, and/or combinations thereof.

In some implementations, the policy rule may indicate one or more conditions associated with at least one of a location and a date, day, and/or time. Here, the method may further involve obtaining at least one of a current location and a current date, day, and/or time associated with the client device, and executing the policy rule in step 608 based on at least one of the current location and the current date, day, and/or time associated with the client device. In some preferred implementations, the VPN client of the client device may receive policy rules in step 606 that provide for selected paths that are balanced tradeoffs or optimizations between security, risk, cost, availability, load, and/or business function. In some further implementations, the VPN client of the client device may receive policy rules in step 606 that provide for selected paths that are balanced tradeoffs or optimizations between security, risk, cost, availability, load, and/or business function that vary depending on the location and/or the date, day, and/or time of day of the client device. A selected path may be or include a tunnel (e.g. a VPN tunnel) or even a direct path outside of the tunnels (e.g. in FIG. 2, one of the plurality of tunnel paths 232, 234, 236, and 238, or direct path 260).

Figure 7:
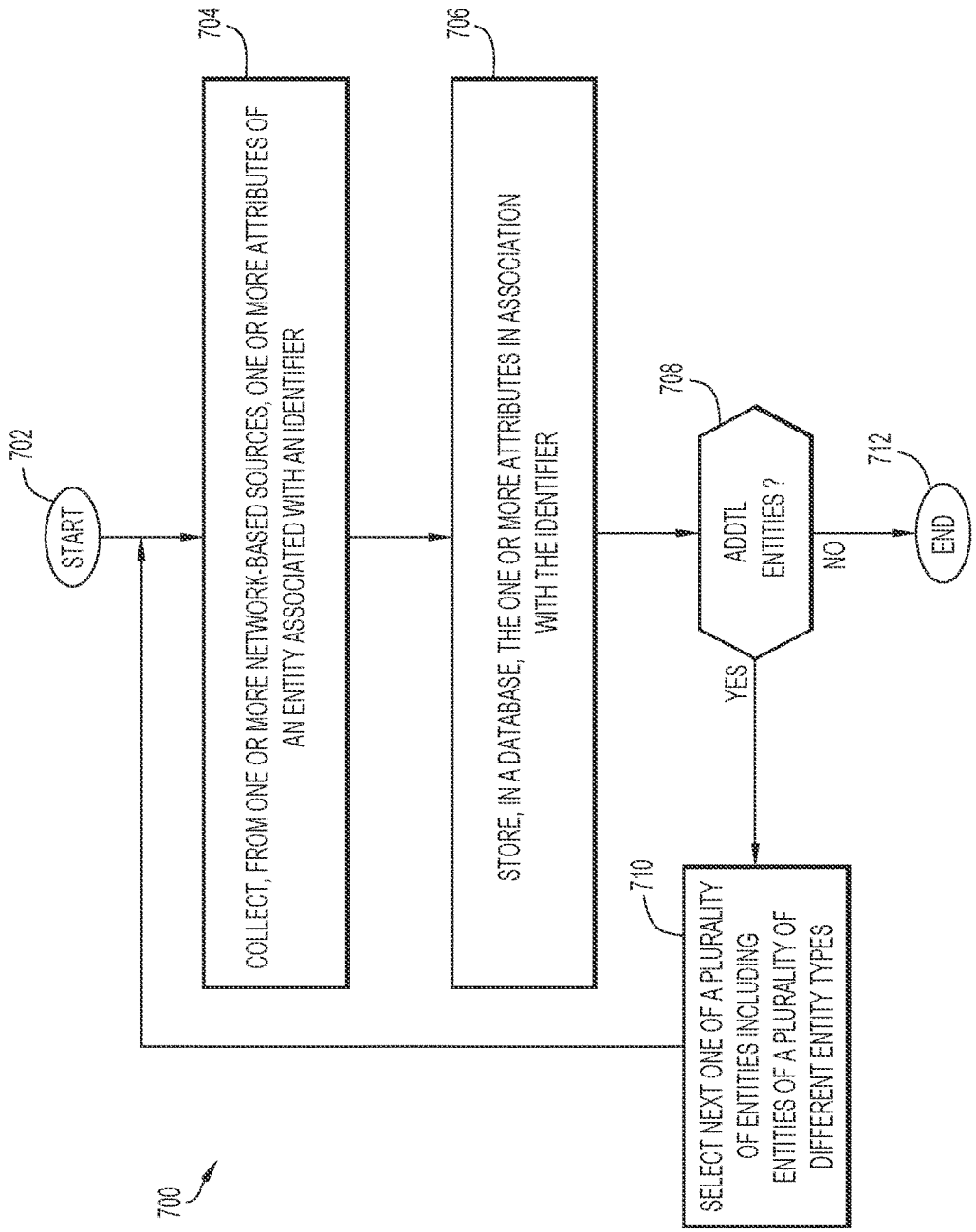
FIG. 7 is a flowchart for describing a method for use in context-based path selection for a VPN client of a client device to facilitate remote access to a plurality of network-based applications according to some implementations of the present disclosure, where the method involves collection and storage of attributes at the processing system.
Figure 8:
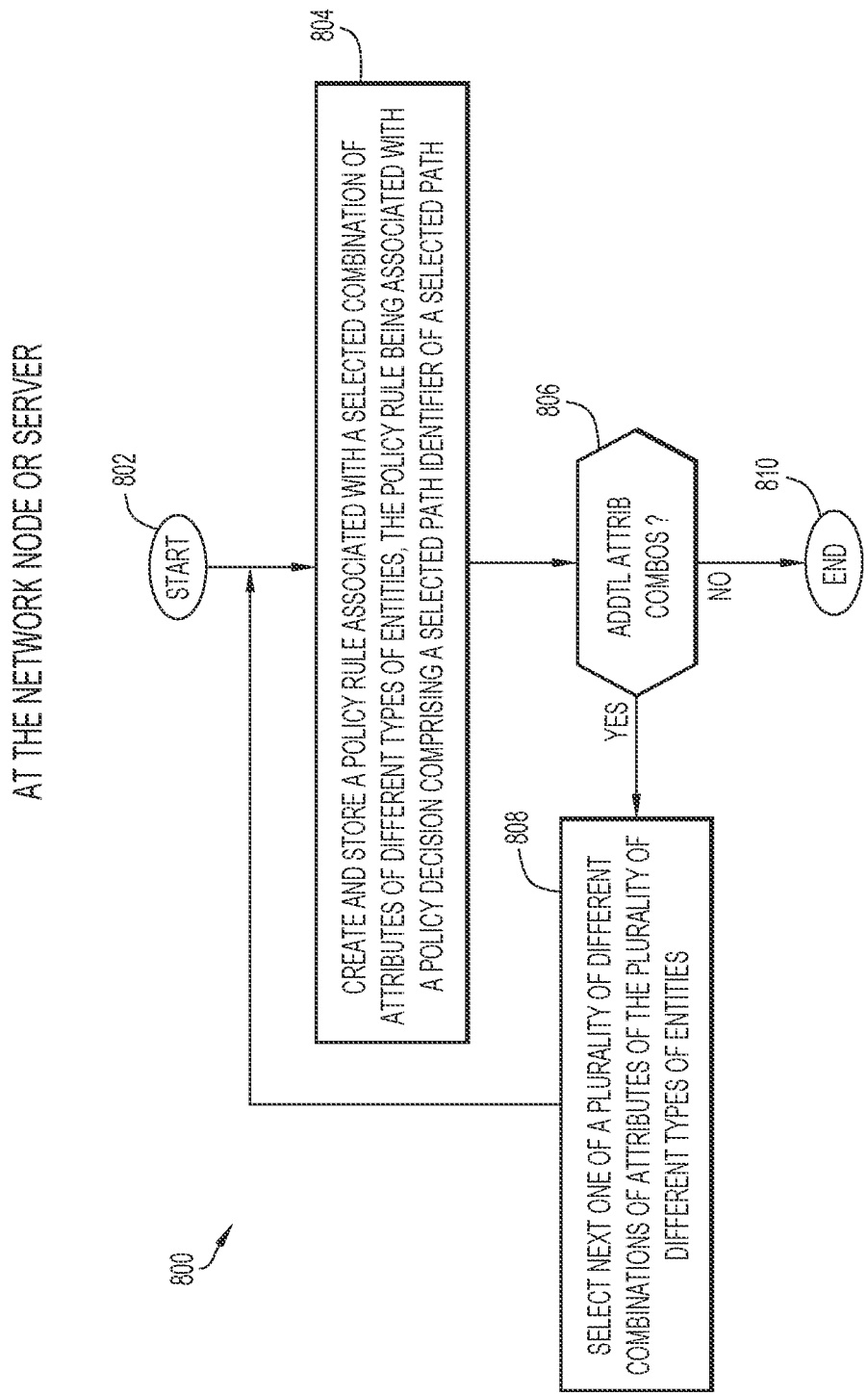
FIG. 8 is a flowchart for describing a method for use in context-based path selection for a VPN client of a client device to facilitate remote access to a plurality of network-based applications according to some implementations of the present disclosure, where the method involves creation and storage of policy rules according to attribute combinations at the processing system.

In some implementations, prior to performing the method of FIG. 5 described earlier above, the network node or computing device (e.g. by a server of the processing system) may perform the methods of FIG. 7-8.

FIG. 7 is a flowchart 700 for describing a method for use in context-based path selection for a VPN client of a client device to facilitate remote access to a plurality of network-based applications via a plurality of network-based services according to some implementations of the present disclosure. The method of FIG. 7 may be performed by a network node or computing device configured to connect in a network for communication. In some implementations, the method of FIG. 7 may be performed a server of processing system 206 of FIG. 2.

Beginning at a start block 702 of FIG. 7, the network node may collect, from one or more network-based sources, one or more attributes of an entity associated with an identifier (step 704 of FIG. 7). The network node may store, in a database, the one or more attributes of the entity in association with the identifier (step 706 of FIG. 7). If there are additional entities for which to perform collection and storage (as tested in step 708 of FIG. 7), then the method repeats at step 704 for a next one of a plurality of entities that is selected (step 710 of FIG. 7). Accordingly, the collection and storage of attributes may be performed for a plurality of entities including entities of a plurality of different types. The entities of the plurality of different types may be or include a plurality of client devices and/or users thereof, a plurality of network-based applications, and/or a plurality of network-based services. The one or more attributes associated with the entity may be indicative of security, risk, cost, availability, load, business function, and/or combinations thereof. If there are no more additional entities for which to perform collection and storage (as tested in step 708 of FIG. 7), then the method will finish at an end block 712.

FIG. 8 is a flowchart 800 for describing a method for use in context-based path selection for a VPN client of a client device to facilitate remote access to a plurality of network-based applications via a plurality of network-based services according to some implementations of the present disclosure. The method of FIG. 7 may be performed by a network node or computing device configured to connect in a network for communication. In some implementations, the method of FIG. 8 may be performed a server of processing system 206 of FIG. 2. The method of FIG. 8 may follow the method described in relation to FIG. 7, and the combined methods of FIGS. 7-8 may precede the methods described in relation to FIGS. 5-6.

Beginning at a start block 802 of FIG. 8, the network node may select a combination of attributes (i.e. source and destination attributes) associated with different types of entities. The different types of entities may be or include client devices and/or users thereof, network-based applications, and network-based services (e.g. data center services, cloud computing services, etc.). The attributes of the different types of entities may be indicative of security, risk, cost, availability, load, business function, and/or combinations thereof. The network node may create and store a policy rule associated with the selected combination of the attributes of the different types of entities (step 804 of FIG. 8). The policy rule may indicate a policy action for selecting a path identified by a path identifier for communications associated with a network-based application. If there are any additional combinations of attributes to consider (from all possible or viable) (as tested in step 806 of FIG. 8), then the method may repeat at step 804 for a next selected attribute combination (step 808 of FIG. 9). Accordingly, the creation and storage of the policy rule may be performed for each one of a plurality of different combinations of attributes of the plurality of different types of entities. If there are no more additional attribute combinations to consider (from all possible or viable) (as tested in step 806 of FIG. 7), then the method will finish at an end block 810.

In some implementations, the network node may operate to create policy rules that provide selected paths that are balanced tradeoffs or optimizations between security, risk, cost, availability, load, and/or business function. In some further implementations, the network node may operate to create policy rules that provide selected paths that are balanced tradeoffs or optimizations between security, risk, cost, availability, load, and/or business function that vary depending on the day, the time of day, and/or the location of the client device. When the context of the client device changes (e.g. a timeout or change in the day/timeframe, or a change in location of the client device), then the VPN client of the client device may be triggered to re-request a selected path from the network node.

FIG. 9 is a table 900 for illustrating an example collection and storage of a plurality of identifiers 902 of entities that are stored in association with one or more attributes 904 of their respective entities. As indicated, the plurality of identifiers 902 are associated with different types of entities, which may include users, client devices, applications (i.e. destination-based applications), and network-based services (e.g. data center services, cloud computing services, etc.). More particularly as shown in FIG. 9, the plurality of identifiers 902 stored in association with their respective one or more attributes 904 may include identifiers 910 associated with different users of client devices (e.g. IDs of User 1, User 2, User 3, etc.); identifiers 912 associated with different types of client devices (e.g. IDs of Device 1, Device 2, Device 3, etc.); identifiers 914 associated with different applications (e.g. IDs of Application 1, Application 2, Application 3, etc.); and identifiers 916 associated with different network-based services (e.g. IDs of Network-Based Service 1, Network-Based Service 2, Network-Based Service 3, etc.). The one or more attributes 904 of the different types of entities may be indicative of security, risk, cost, availability, load, business function, and/or combinations thereof.

In some implementations, the collection and storage of the data of FIG. 9 may be performed based on the method of FIG. 7, for the creation and storage of policy rules according to the method of FIG. 8, and/or for the processing of the requests for obtaining the one or more source attributes and the one or more destination attributes according to the method of FIG. 6 (e.g. step 604 of FIG. 6).

Figure 10:
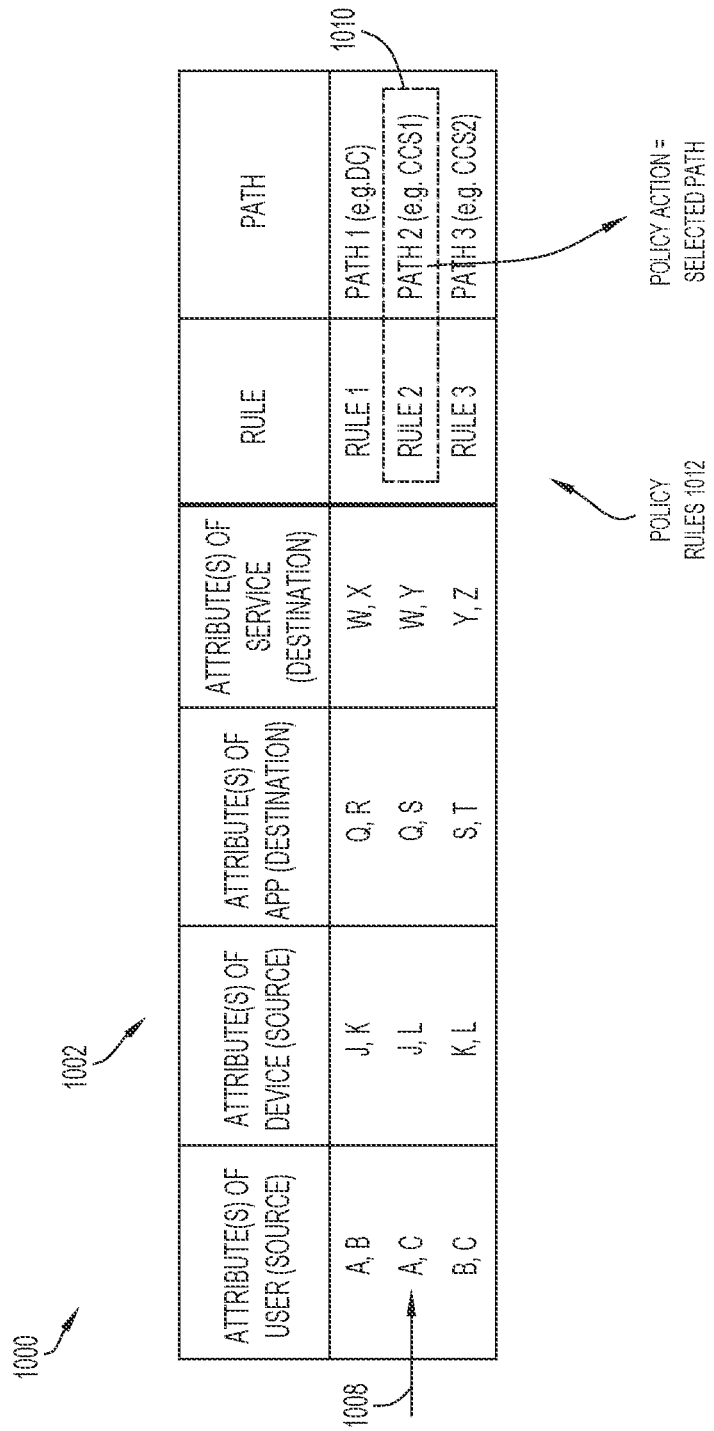
FIG. 10 is a table for illustrating an example creation and storage of a plurality of policy rules associated with selected combinations of attributes of the different types of entities.

FIG. 10 is a table 1000 for illustrating an example creation and storage of a plurality of policy rules 1012 associated with selected combinations 1002 of attributes of different types of entities (e.g. users, client devices, network-based applications, and/or network-based services). The plurality of policy rules 1012 may be associated with different policy actions for selecting different paths for communications to network-based applications, where each policy action indicates a path identifier of a selected path (e.g. PATH 1, PATH 2, PATH 3, or PATH 4). For example, a selected combination 1008 of attributes associated with a particular user, client device, and destination application may be stored in association with a policy rule 1010 which indicates a policy action for selecting a specified path (e.g. Path 2 via CCS1).

FIG. 11 is a table 1100 for illustrating a more specific example of collection and storage of a plurality of identifiers that are stored in association with one or more attributes of their respective entities. In FIG. 11, an "Application 1" is associated with "hrapp1.domain.org" and an "Application 2" is associated with "hrapp2.domain.org". "Application 1" is associated with attributes indicative of an HR application, PII data, a high-compliance risk, and a two-factor authentication (2FA) enabled application, whereas "Application 2" is associated with an HR application, a 2FA enabled application, but no PII data. A "User" (and/or client device thereof) is associated with attributes indicative of an HR user, a compliant device, and a corporate asset.

FIG. 12 is a table 1200 for illustrating a more specific example of creation and storage of a plurality of policy rules associated with selected combinations of attributes of different types of entities. An HR user on a compliant device, for traffic to an HR application with PII data, with a high-compliant risk, is associated with a route decision to a data center (or "DC"). On the other hand, an HR user on a compliant device, for traffic to an HR application with 2FA enabled and no PII data, is associated with a route decision to a particular cloud computing service (e.g. to AWS). Further, an HR user (e.g., on an unknown device) for external traffic is associated with a route decision to a cloud computing service with enhanced networking functions (e.g. to the SASE).

Thus, as described, techniques and mechanisms for context-based path selection for VPN clients of client devices to facilitate remote access to a plurality of network-based applications provided via a plurality of network-based services are provided. In one illustrative example, a method may be performed at a server of a processing system configured for VPN clients to facilitate remote access to a plurality of network-based applications provided via a plurality of network-based services. The method may involve receiving, from a VPN client of a client device, a message which indicates a request for a policy rule for communications with a network-based application. The message which indicates the request for the policy rule may include one or more source identifiers associated with the client device and/or a user thereof and a destination identifier associated with the network-based application. The method may further involve obtaining one or more source attributes of the client device and/or the user thereof based on the one or more source identifiers, and one or more destination attributes of the network-based application based on the destination identifier. The method may further involve selecting a policy rule that is associated with the one or more source attributes and the one or more destination attributes. The method may further involve sending, to the VPN client of the client device, a message which indicates a response to the request and includes the policy rule for application at the VPN client, where the policy rule indicates a policy action for selecting a path, of a plurality of paths, identified by a path identifier for the communications with the network-based application.

In some implementations, the plurality of network-based services may comprise a data center service and one or more cloud computing services, and the plurality of paths may include paths comprising a plurality of tunnels. In some implementations, the one or more source attributes and the one or more destination attributes that are used to select the policy rule may comprise attributes indicative of security, risk, cost, availability, load, business function, and/or combinations thereof. In some implementations, the policy rule may indicate one or more conditions associated with at least one of a location and a date, day, and/or time associated with the client device. In some preferred implementations, the server of the processing system may operate to create policy rules that provide selected paths that are balanced tradeoffs or optimizations between security, risk, cost, availability, load, and/or business function. In some further implementations, the server of the processing system may operate to create policy rules that provide selected paths that are balanced tradeoffs or optimizations between security, risk, cost, availability, load, and/or business function that vary depending on the location and/or the date, day, and/or time of day of the client device.

Prior to performing the above-described steps, the server of the processing system may perform pre-processing steps including, for each one of a plurality of entities including entities of a plurality of different types (e.g. a plurality of client devices and/or users thereof and the plurality of network-based applications), collecting, from one or more network-based sources, one or more attributes of an entity associated with an identifier. Additional pre-processing steps may further include storing, in an attributes database, the one or more attributes of the entity in association with the identifier. Additional pre-processing steps may further include, for each one of a plurality of different combinations of attributes of the plurality of different types of entities, creating and storing, in a policy database, a policy rule associated with a selected combination of attributes of the different types of entities, where the policy rule indicates a policy action for selecting a path, of a plurality of paths, identified by a path identifier.

In another illustrative example, a method may be performed at a VPN client of a client device to facilitate remote access to a plurality of network-based applications provided via a plurality of network-based services. The method may involve sending, to a server, a message which indicates a request for a policy rule for communications with a network-based application. The method may further involve receiving, from the server, a message which indicates a response to the request and includes the policy rule, and storing the policy rule in memory. The method may further involve executing the policy rule which indicates a policy action for selecting a path, of a plurality of paths, identified by a path identifier for the communications with the network-based application. The method may further involve directing communications associated with at least a destination identifier of the network-based application via the selected path corresponding to the selected path identifier.

In some implementations, the plurality of network-based services may comprise a data center service and one or more cloud computing services, and the plurality of paths may include paths comprising a plurality of tunnels. In some implementations, the message which indicates the request for the policy rule may include one or more source identifiers associated with the client device and/or a user thereof and a destination identifier associated with the network-based application. In some implementations, the policy rule may be selected based on one or more source attributes of the client device and/or the user thereof based on the one or more source identifiers and one or more destination attributes of the network-based application based on the destination identifier. In some implementations, the one or more source attributes and the one or more destination attributes that are used to select the policy rule may comprise attributes indicative of security, risk, cost, availability, load, business function, and/or combinations thereof. In some implementations, the policy rule may indicate one or more conditions associated with at least one of a location and a date, day, and/or time. Here, the method may further involve obtaining at least one of a current location and a current date, day, and/or time associated with the client device, and executing the policy rule based on at least one of the current location and the current date, day, and/or time associated with the client device. In some preferred implementations, the VPN client of the client device may receive policy rules that provide for selected paths that are balanced tradeoffs or optimizations between security, risk, cost, availability, load, and/or business function. In some further implementations, the VPN client of the client device may receive policy rules that provide for selected paths that are balanced tradeoffs or optimizations between security, risk, cost, availability, load, and/or business function that vary depending on the location and/or the date, day, and/or time of day of the client device.

In some implementations, attributes may indicate differences between network-based applications that HR applications (e.g. sensitive) versus standard applications (e.g. non-sensitive), client devices that are non-compliant devices versus compliant devices, client devices that are corporate assets versus non-corporate assets, client devices that are high-compliant risk versus low-compliant risk, network-based applications that involve PII data versus non-PII data, and users that are high status employees versus normal status employees, as examples.

A computer program product may include a non-transitory computer readable medium and instructions in the non-transitory computer readable medium, where the instructions are executable by one or more processors for performing the methods described herein. A computing device, such as a network node or a user device, may include one or more processors, one or more interfaces to connect in a network, and one or more memory elements for storing instructions executable on the one or more processors for performing the methods described herein.

Figure 13:
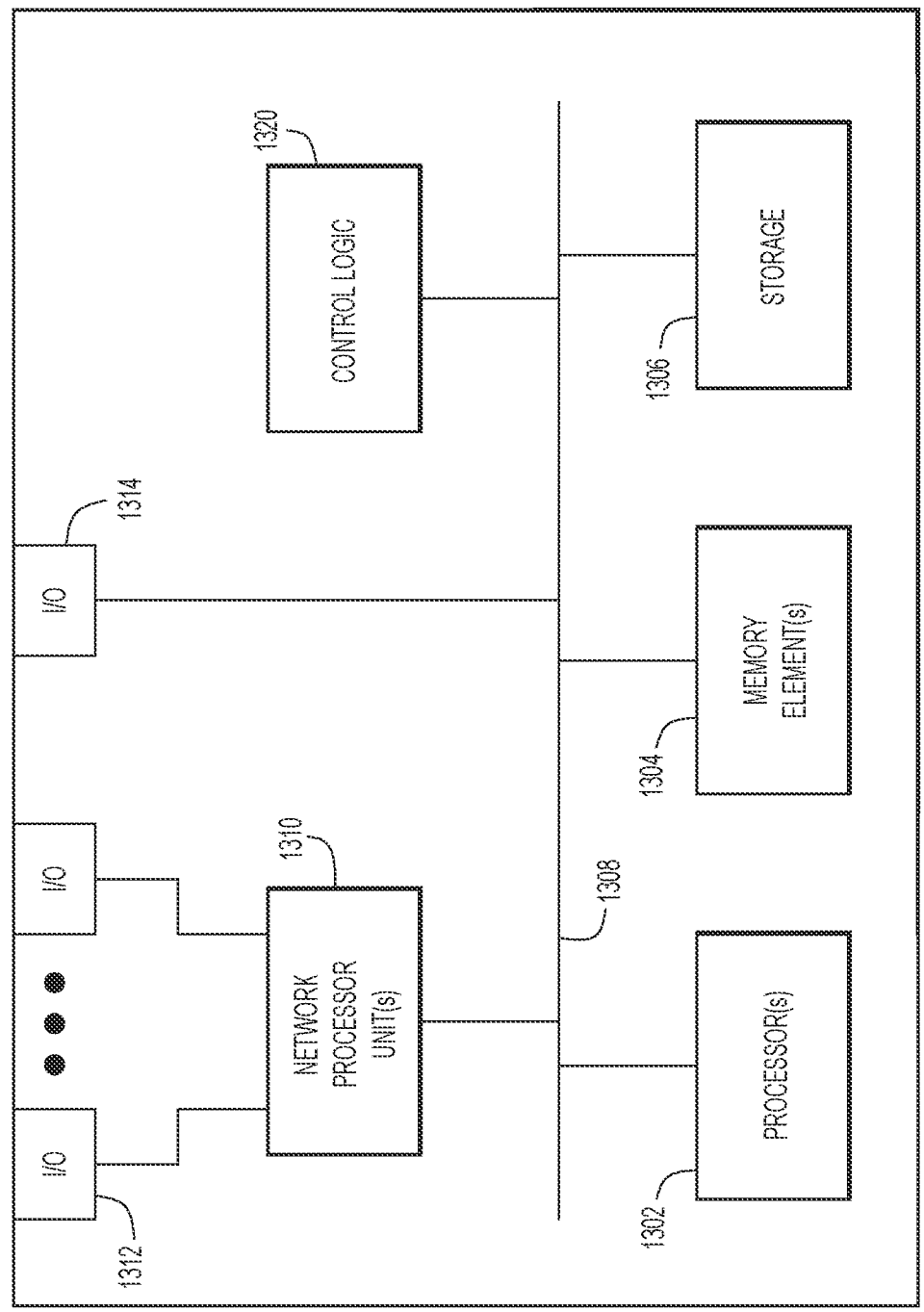
FIG. 13 illustrates a hardware block diagram of a computing device (e.g. a network node or a user device) that may perform functions associated with operations discussed herein.

FIG. 13 illustrates a hardware block diagram of a computing device 1300 that may perform functions associated with operations discussed herein in connection with the techniques described in relation to the above figures, especially in relation to FIGS. 2-12. In various embodiments, a computing device, such as computing device 1300 or any combination of computing devices 1300, may be configured as any entity/entities as discussed for the techniques depicted in connection with the figures in order to perform operations of the various techniques discussed herein (e.g. in processing system 206 and/or client device 204 of FIG. 2).

In at least one embodiment, the computing device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with memory element(s) 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, and/or any other I/O port(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to computing device 1300. For example, I/O interface(s) 1314 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory element(s) 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and 'one or more of' can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   at a server for virtual private network (VPN) clients to facilitate remote access to a plurality of network-based applications provided via a plurality of network-based services,
   receiving, from a VPN client of a client device, a message which indicates a request for a policy rule for communications with a network-based application;
   obtaining one or more source attributes of the client device and/or a user thereof based on one or more source identifiers associated with the client device and/or the user thereof, and one or more destination attributes of the network-based application based on a destination identifier associated with the network-based application;
   selecting the policy rule that is associated with the one or more source attributes and the one or more destination attributes; and
   sending, to the VPN client of the client device, a message which indicates a response to the request and includes the policy rule for application at the VPN client, the policy rule indicating a policy action for selecting a path, of a plurality of paths, identified by a path identifier for the communications with the network-based application.

2. The method of claim 1, wherein the policy rule indicates one or more conditions associated with at least one of a location and a date, day, and/or time associated with the client device.

3. The method of claim 1, wherein the one or more source attributes and the one or more destination attributes comprise attributes indicative of security, risk, cost, availability, load, and/or business function.

4. The method of claim 1, wherein the plurality of network-based services comprise a data center service and one or more cloud computing services, and the plurality of paths include paths comprise a plurality of tunnels.

5. The method of claim 1, further comprising:
   repeating receiving, obtaining, selecting, and sending for each one of a plurality of requests associated with a plurality of network-based applications.

6. The method of claim 1, further comprising:
   repeating receiving, obtaining, selecting, and sending for each one of a plurality of requests from a plurality of VPN clients respectively associated with a plurality of client devices.

7. The method of claim 1, further comprising:
   at the server, for each one of a plurality of entities including entities of a plurality of different types, wherein the entities of the plurality of different types comprise a plurality of client devices and/or users thereof and the plurality of network-based applications, collecting, from one or more network-based sources, one or more attributes of an entity associated with an identifier; and storing, in an attributes database, the one or more attributes of the entity in association with the identifier.

8. The method of claim 7, comprising:

at the server, for each one of a plurality of different combinations of attributes of the plurality of different types of entities, creating and storing, in a policy database, a policy rule associated with a selected combination of attributes of the plurality of different types of entities, the policy rule indicating a policy action for selecting a path identified by a path identifier.

9. A network node comprising:

one or more processors;

one or more interfaces to connect in a network; and one or more memory elements for storing instructions executable on the one or more processors for implementing a server for virtual private network (VPN) clients to facilitate remote access to a plurality of network-based applications provided via a plurality of network-based services, by:

receiving, from a VPN client of a client device, a message which indicates a request for a policy rule for communications with a network-based application;

obtaining one or more source attributes of the client device and/or a user thereof based on one or more source identifiers associated with the client device and/or the user thereof, and one or more destination attributes of the network-based application based on a destination identifier associated with the network-based application;

selecting the policy rule that is associated with the one or more source attributes and the one or more destination attributes; and sending, to the VPN client of the client device, a message which indicates a response to the request and includes the policy rule for application at the VPN client, the policy rule indicating a policy action for selecting a path, of a plurality of paths, identified by a path identifier for the communications with the network-based application.

10. The network node of claim 9, wherein the policy rule indicates one or more conditions associated with at least one of a location and a date, day, and/or time associated with the client device.

11. The network node of claim 9, wherein:

the plurality of network-based services comprise a data center service and one or more cloud computing services, the plurality of paths include paths comprising a plurality of tunnels, and the one or more source attributes and the one or more destination attributes comprise attributes indicative of security, risk, cost, availability, load, and/or business function.

12. The network node of claim 9, wherein the instructions are executable on the one or more processors further for:

repeating receiving, obtaining, selecting, and sending for each one of a plurality of requests from a plurality of VPN clients respectively associated with a plurality of client devices.

13. The network node of claim 9, wherein the instructions are executable on the one or more processors further for:

for each one of a plurality of entities including entities of a plurality of different types, wherein the entities of the plurality of different types comprise a plurality of client devices and/or users thereof and a plurality of network-based applications, collecting, from one or more network-based sources, one or more attributes of an entity associated with an identifier; and storing, in an attributes database, the one or more attributes of the entity in association with the identifier.

14. The network node of claim 13, wherein the instructions are executable on the one or more processors further for:

for each one of a plurality of different combinations of attributes of the plurality of different types of entities, creating and storing, in a policy database, a policy rule associated with a selected combination of attributes of the plurality of different types of entities, the policy rule indicating a policy action for selecting a path identified by a path identifier.

15. A method comprising:

at a virtual private network (VPN) client for use with a client device to facilitate remote access to a plurality of network-based applications provided via a plurality of network-based services, sending, to a server, a message which indicates a request for a policy rule for communications with a network-based application;

receiving, from the server, a message which indicates a response to the request and includes the policy rule, and storing the policy rule in memory;

executing the policy rule which indicates a policy action for selecting a path, of a plurality of paths, identified by a path identifier for the communications with the network-based application; and directing communications associated with at least a destination identifier of the network-based application via the path corresponding to the path identifier.

16. The method of claim 15, wherein the policy rule indicates one or more conditions associated with at least one of a location and a date, day, and/or time, the method further comprising:

at the VPN client:

obtaining at least one of a current location and a current date, day, and/or time associated with the client device, wherein the policy rule is executed based on at least one of the current location and the current date, day, and/or time associated with the client device.

17. The method of claim 15, further comprising:

at the VPN client, repeating sending, receiving, executing, and directing for communications associated with each one of a plurality of network-based applications.

18. The method of claim 15, wherein:

the plurality of network-based services include a data center service and one or more cloud computing services, and the plurality of paths include a plurality of tunnels, the message which indicates the request for the policy rule including one or more source identifiers associated with the client device and/or a user thereof and a destination identifier associated with the network-based application, the path identifier of the path of the policy action is based on one or more source attributes of the client device and/or the user thereof based on the one or more source identifiers and one or more destination attributes of the network-based application based on the destination identifier, and the one or more source attributes and the one or more destination attributes comprise attributes indicative of security, risk, cost, availability, load, and/or business function.

19. The method of claim 15, further comprising:

at the server, receiving, from the VPN client of the client device, the message which indicates the request for the policy rule, the message which indicates the request including one or more source identifiers associated with the client device and/or a user thereof and a destination identifier associated with the network-based application;

obtaining one or more source attributes of the client device and/or the user thereof based on the one or more source identifiers, and one or more destination attributes of the network-based application based on the destination identifier;

selecting the policy rule that is associated with the one or more source attributes and the one or more destination attributes; and sending, to the VPN client of the client device, the message which indicates the response to the request and includes the policy rule.

20. The method of claim 19, further comprising:

at the server, for each one of a plurality of entities including entities of a plurality of different types, wherein the entities of the plurality of different types comprise a plurality of client devices and/or users thereof and a plurality of network-based applications:

collecting, from one or more network-based sources, one or more attributes of an entity associated with an identifier; and storing, in an attributes database, the one or more attributes of the entity in association with the identifier; and at the server, for each one of a plurality of different combinations of attributes of the plurality of different types of entities, creating and storing, in a policy database, a policy rule associated with a selected combination of attributes of the plurality of different types of entities, the policy rule indicating a policy action for selecting a path identified by a path identifier.

* * * * *